US006197873B1

(12) United States Patent
Miyata et al.

(10) Patent No.: US 6,197,873 B1
(45) Date of Patent: Mar. 6, 2001

(54) IMPACT-RESISTANT BLEND COMPOSITIONS OF POLYCARBONATE AND POLYESTER RESINS

(75) Inventors: Hirotaka Miyata, Hyogo; Hiromitsu Hamano, Hiroshima, both of (JP)

(73) Assignee: Daicel Chemical Industry, Ltd. (JP)

( * ) Notice: Subject to any disclaimer, the term of this patent is extended or adjusted under 35 U.S.C. 154(b) by 0 days.

(21) Appl. No.: 09/273,451

(22) Filed: Mar. 22, 1999

(30) Foreign Application Priority Data

Mar. 23, 1998 (JP) .................................................. 10-093998

(51) Int. Cl.$^7$ .............................. C08L 69/00; C08L 67/02
(52) U.S. Cl. .......................................... 524/505; 525/92 E
(58) Field of Search ............................ 525/92 E; 524/505

(56) References Cited

U.S. PATENT DOCUMENTS 5,055,523 * 10/1991 Inoue .

FOREIGN PATENT DOCUMENTS

658603 * 6/1995 (EP) .
761763 * 3/1997 (EP) .

OTHER PUBLICATIONS

Abstract of Japanese Patent Application Laid–Open No. 7–25984.
Abstract of Japanese Patent Application Laid–Open No. 8–48861.
Abstract of Japanese Patent Application Laid–Open No. 9–157504.
Abstract of Japanese Patent Application Laid–Open No. 1–256560 corresponding to CA No. 112:159807w.

* cited by examiner

Primary Examiner—David J. Buttner
(74) Attorney, Agent, or Firm—Nixon & Vanderhye P.C.

(57) ABSTRACT

The present invention provides a resin composition containing the following components (1) and (2): (1) 100 parts by weight of a resin blend formed of an aromatic polycarbonate resin (A) in an amount of 40–80 wt. % and an aromatic polyester resin (B) in an amount of 60–20 wt. %; (2) 2–10 parts by weight of an epoxy-modified block polymer (G) or (H), wherein the epoxy-modified block polymer (G) is a polymer which is obtained by epoxidation of double bonds derived from the conjugated diene compound in a block copolymer (E) which comprises in the molecule a polymer block (C) predominantly comprising an aromatic vinyl compound and a polymer block (D) predominantly comprising a conjugated diene compound; and the epoxy-modified hydrogenated block polymer (H) is a polymer which is obtained by epoxidation of residual double bonds in a partially hydrogenated block polymer (F) which is formed by partial hydrogenation of double bonds derived from the conjugated diene compound in the above block copolymer (E).

The present invention also provides a thin-walled molded product obtained by molding the resin composition.

6 Claims, No Drawings

IMPACT-RESISTANT BLEND COMPOSITIONS OF POLYCARBONATE AND POLYESTER RESINS

BACKGROUND OF THE INVENTION

1. Field of the Invention

The present invention relates to a resin composition useful for thin-wall molded products such as integrated circuit (IC) cards, playing cards, and floppy disks; structural components for office-automation appliances, communications equipment such as portable phones, and household electrical appliances; and automobile parts. More particularly, the present invention relates to an impact-resistant resin composition which comprises a polycarbonate resin and a polyester resin as main components thereof and which has improved impact resistance through the aid of an added specific epoxy-modified block copolymer, and to a molded product obtained by molding the resin composition.

2. Background of the Invention

It has recently been thought that electronic-commerce cards (electronic money) will be rapidly developed and put into full-scale practical use in the near future. Heretofore, polyvinyl-based materials have been used for manufacturing cards; however, it is assumed that substitution for polyvinyl resin will be strongly promoted due to the environmental problem of dioxin.

Plastic cards have a thickness as thin as 1 mm or less, and material used in production thereof requires high fluidity and impact resistance. ABS resin, polycarbonate resin, polybutylene terephthalate, and polyethylene terephthalate resins have been developed as a substitute for vinyl chloride; however, these resins have never combined high fluidity with high impact resistance. In an effort to improve the impact resistance, a method of adding elastomer to these resins has been tested; however, the elastomer suffers the problem of lacking affinity and dispersibility to the resins.

In view of the foregoing, the present inventors have disclosed in Japanese Patent Application Laid-Open (kokai) No. 25984/1995 an epoxy-modified block polymer or a partially-hydrogenated-epoxy-modified block polymer which is useful as an impact-resistance enhancer.

U.S. Pat. No. 2,676,525 discloses a composition which is obtained by dispersing a modified hydrogenated block copolymer (b) obtained by the following method in a thermoplastic resin (a) including polycarbonate resin, or polycarbonate resin and polyester resin. The modified hydrogenated block copolymer (b) is obtained by grafting a glycidyl-group-containing unsaturated compound to a hydrogenated block copolymer obtained by partially hydrogenating an aliphatic double bond based on a conjugated diene compound of a block copolymer including a conjugated diene and a vinyl-group-containing aromatic hydrocarbon. However, the glycidyl-group-modified hydrogenated block copolymer (b) which is used herein involves the problem of being likely to gel due to heat applied in the manufacturing process thereof and in the process of producing molded products therefrom.

Japanese Patent Application Laid-Open (kokai) No. 157504/1997 discloses a hydrogenated or nonhydrogenated block copolymer modified with an ethylenic-unsaturated-group-containing carboxylic acid (e.g. maleic anhydride) or derivatives thereof.

Japanese Patent Application Laid-Open (kokai) No. 48861/1996 discloses a hydrogenated block copolymer modified with an hydroxyl-group-containing α,β-unsaturated carboxylic acid and an aromatic vinyl compound.

However, the disclosed polymers heretofore do not adequately meet the requirement of high impact resistance and mold-processability, especially for material used for thin-wall molded products such as IC cards.

SUMMARY OF THE INVENTION

An object of the present invention is to provide a resin composition for producing thin-wall molded products, which composition has excellent fluidity and dispersibility, and which especially combines excellent high impact resistance with mold-processability, and to provide a molded product obtained therefrom.

The present inventors have conducted earnest studies in order to solve the above problems and as a result have attained the present invention.

Accordingly, in a first aspect of the present invention, there is provided a resin composition comprising 100 parts by weight of a resin blend (I) formed of 40–80 wt. % of an aromatic polycarbonate resin (A) and 60–20 wt. % of an aromatic polyester resin (B), the sum of (A)+(B) being 100 wt. %; and 2–10 parts by weight of an epoxy-modified block polymer (G) and/or an epoxy-modified hydrogenated block polymer (H), wherein the epoxy-modified block polymer (G) is a polymer which is obtained by epoxidation of double bonds derived from the conjugated dien compounds in a block copolymer (E) which comprises in the molecule a polymer block (C) predominantly comprising an aromatic vinyl compound and a polymer block (D) predominantly comprising a conjugated diene compound; and the epoxy-modified hydrogenated block polymer (H) is a polymer which is obtained by epoxidation of residual double bonds in a partially hydrogenated block copolymer (F) which is formed by partial hydrogenation of double bonds derived from the conjugated diene compound in the above block copolymer (E).

Preferably, in the first aspect of the present invention, the aromatic polycarbonate resin (A) has a ratio of the number of terminal hydroxy groups to the total number of molecular ends in the polycarbonate resin of 1–40% (hereinafter the ratio may be referred to as a "terminal hydroxyl ratio").

Preferably, in the first aspect of the present invention, the aromatic polyester resin (B) is at least one species selected from among polybutylene terephthalate (PBT), polyethylene terephthalate (PET), poly(1,4-cyclohexanedimethylene) terephthalate, and poly(1,4-cyclohexanedimethylene/ethylene) terephthalate.

Preferably, in the first aspect of the present invention, the resin composition further contains titanium oxide in an amount of 5–30 parts by weight based on 100 parts by weight of the resin blend (I).

Preferably, in the first aspect of the present invention or the resin composition further containing titanium oxide, the resin composition further contains a reaction accelerator for epoxy groups in an amount of 0.001–2 parts by weight based on 100 parts by weight of the resin blend (I).

In a second aspect of the present invention, there is provided a molded product formed by molding any of the resin compositions of the first aspect.

In a third aspect of the present invention, there is provided an IC card or playing cards formed by molding any of the resin compositions.

BEST MODES FOR CARRYING OUT THE INVENTION

The present invention will next be described in detail.
Aromatic Polycarbonate Resin (A)

In the present invention, homo-polycarbonates (obtained from one kind of bisphenol) and copolymerized-polycarbonates (obtained from a plurality of kinds of bisphenols) may be used as the aromatic polycarbonate resin (A), and the polycarbonates may be produced through any of the methods known in the art. In addition, the polycarbonates may be branched or linear, and a mixture of a linear polycarbonate and a branched polycarbonate may also be used.

In general, aromatic polycarbonate resins are produced in the presence of an acid-acceptor and a molecular-weight-controlling agent through reaction of a dihydric phenol and phosgene or through transesterification of a dihydric phenol with a compound such as a carbonate diester.

In the present invention, bisphenols are preferably used as the dihydric phenol, with 2,2-bis(4-hydroxyphenyl) propane—i.e., bisphenol A—being particularly preferred. Bisphenol A may be partially or entirely substituted with another divalent phenol. In addition to bisphenol A, examples of the dihydric phenols include bis(4-hydroxyphenyl)alkanes such as hydroquinone, 4,4'-dihydroxydiphenyl, bis(4-hydroxyphenyl)methane, or 1,1-bis(4-hydroxyphenyl)ethane; bis(4-hydroxyphenyl) cycloalkanes such as 1,1-bis(4-hydroxyphenyl) cyclohexane; compounds such as bis(4-hydroxyphenyl) sulfide, bis(4-hydroxyphenyl) sulfone, bis(4-hydroxyphenyl) sulfoxide, or bis(4-hydroxyphenyl) ether; alkylated bisphenols such as 2,2-bis(3-methyl-4-hydroxyphenyl)propane or 2,2-bis(3,5-dimethyl-4-hydroxyphenyl)propane; and halogenated bisphenols such as 2,2-bis(3,5-dibromo-4-hydroxyphenyl)propane or 2,2-bis (3,5-dichloro-4-hydroxyphenyl)propane.

The aromatic polycarbonate resins having a terminal hydroxyl ratio of 1–40% that are preferably used in the present invention may be produced through polycondensation by transesterification under the molten state by use of the above-described dihydric phenol, the carbonate diester, a basic catalyst, and an acidic substance neutralizing the basic catalyst, or may be produced without being restricted to this method.

Examples of the carbonate diesters include diphenyl carbonate, ditolyl carbonate, bis(chlorophenyl) carbonate, di(m-cresyl) carbonate, dinaphthyl carbonate, bis(biphenyl) carbonate, diethyl carbonate, dimethyl carbonate, dibutyl carbonate, and dicyclohexyl carbonate. of these, diphenyl carbonate is particularly preferred.

When an aromatic polycarbonate resin is produced from bisphenol A and diphenyl carbonate through transesterification performed under the molten state, the ends of the polycarbonate assume a hydroxyphenyl group and a phenyl group. The terminal phenolic hydroxyl ratio can be arbitrarily controlled by increasing the ratio of amount of diphenyl carbonate to that of bisphenol A in the production of the polycarbonate resin. When the terminal phenolic hydroxyl ratio is in excess of 40%, hue and thermal stability of the resin are deteriorated. Thus, the terminal phenolic hydroxyl ratio is preferably 40% or less, more preferably 30% or less.

Although reducing the terminal phenolic hydroxyl ratio to 3% or less is generally difficult in transesterification under the molten state, the terminal phenolic hydroxyl ratio can be reduced to as low as about 1% when a phosgenation method is employed. Thus, the above terminal hydroxyl ratio of the aromatic polycarbonate resin used in the present invention is preferably between 3% and 30% inclusive.

Aromatic Polyester Resin (B)

In the present invention, the aromatic polyester resin (B) is a reaction product or a mixture of reaction products of an aromatic dicarboxylic acid or a reactive derivative thereof (such as its dimethyl ester or its anhydride) with an aliphatic, alicyclic, or aromatic diol, or a mixture of the diols. The aromatic polyester resins may be produced through known methods.

In general, dicarboxylic acid compounds such as terephthalic acid or dimethyl terephthalate are used as the aromatic dicarboxylic acid or the reactive derivative thereof. However, in the present invention, there may be used a mixture of terephthalic acid and at least one acid selected from the group consisting of C8–C14 other aromatic or alicyclic dicarboxylic acids; C4–C12 aliphatic dicarboxylic acids; dicarboxylic acids having a benzene nucleus such as phthalic acid, isophthalic acid, or 4,4'-diphenyldicarboxylic acid; dicarboxylic acids having a naphthalene nucleus such as 2,6-naphthalenedicarboxylic acid; succinic acid; adipic acid; sebacic acid; azelaic acid; and cyclohexanediacetic acid.

The diol component of the aromatic polyester resin typically comprises at least one diol selected from the group consisting of ethylene glycol, 1,4-butanediol, and 1,4-cyclohexanedimethylol.

In addition to the above diols, the diol component may contain at least one diol selected from the group consisting of C3–C12 other aliphatic diols such as 1,3-propanediol, 2-ethyl-1,3-propanediol, neopentyl glycol, 1,5-pentanediol, 1,6-hexanediol, 3-ethyl-2,4-pentanediol, 2-methyl-2,4-pentanediol, 2,2,4-trimethyl-1,4-pentanediol, 2,2,4-trimethyl-1,5-pentanediol, 2-ethyl-1,3-hexanediol, 2,2-diethyl-1,3-propanediol, or 2,5-hexanediol; C6–C21 alicyclic diols such as 2,2-bis(4-hydroxycyclohexyl)propane or 2,4-dihydroxy-1,1,3,3-tetramethylcyclobutane; and aromatic diols such as 1,4-di(2-hydroxyethoxy)benzene, 2,2-bis(3-(2-hydroxyethoxy)phenyl)propane, 2,2-bis(4-hydroxyphenyl)propane or 2,2-bis(4-hydroxypropylphenyl) propane.

The aromatic polyester resin used in the present invention may be branched through incorporation of a trihydric or tetrahydric alcohol or a tribasic or tetrabasic carboxylic acid in a relatively small amount. Preferably, the resin is branched through incorporation of at least one species selected from the group consisting of trimesic acid, trimellitic acid, trimethylolethane, trimethylolpropane, and pentaerythritol.

Examples of the preferable aromatic polyester resins include polyethylene terephthalate, polybutylene terephthalate, poly(1,4-cyclohexanedimethylene) terephthalate, poly(1,4-cyclohexanedimethylene/ethylene) terephthalate, and copolymers thereof. The aromatic polyester which is preferably used in the present invention has an intrinsic viscosity of 0.5–1.6 dl/g (as measured by use of orthochlorophenol at 25° C.).

The resin blend (I) comprises 40–80 wt. % of an aromatic polycarbonate resin (A) and 60–20 wt. % of an aromatic polyester resin (B), the sum of (A)+(B) being 100 wt. %.

When the content of the aromatic polycarbonate resin (A) is less than 40 wt. %, the impact strength is poor, whereas when it is in excess of 80 wt. %, the melt viscosity of the polycarbonate resin increases to result in low fluidity and to cause difficulty in injection-molding of thin-wall products and the like.

When the content of the aromatic polyester resin (B) is in excess of 60 wt. %, the impact strength is poor, whereas when it is less than 20 wt. %, the fluidity of the polyester resin decreases to cause difficulty in injection-molding of thin-wall products and the like.

Epoxy-modified Block Polymers (G) and (H)

The epoxy-modified block polymer (G) used in the present invention is a polymer which is obtained by epoxidation of double bonds derived from the conjugated diene compound in a block copolymer (E) which comprises in the molecule a polymer block (C) predominantly comprising an aromatic vinyl compound and a polymer block (D) predominantly comprising a conjugated diene compound.

The epoxy-modified block polymer (H) used in the present invention is a polymer which is obtained by epoxidation of residual double bonds in a partially hydrogenated block copolymer (F) which is formed by partial hydrogenation of double bonds derived from the conjugated diene compound in the above block copolymer (E).

Block Copolymer (E)

The above block copolymer (E) which is used in the present invention comprises in the molecule a polymer block (c) predominantly comprising an aromatic vinyl compound and a polymer block (D) predominantly comprising a conjugated diene compound.

Examples of the aromatic vinyl compound which constitutes the polymer block (C) include styrene, α-methylstyrene, vinyltoluene, p-tert-butylstyrene, divinylbenzene, p-methylstyrene, 1,1-diphenylstyrene, and a mixture of two or more thereof. Of these, styrene is preferred.

Examples of the conjugated diene compound which constitutes the polymer block (D) include butadiene, isoprene, 1,3-pentadiene, 2,3-dimethyl-1,3-butadiene, piperylene, 3-butyl-1,3-octadiene, 2-phenyl-1,3-butadiene, and a mixture of two or more thereof. Of these, butadiene, isoprene, and the combination thereof are preferred.

The proportion of the polymer block (C) predominantly comprising an aromatic vinyl compound and the polymer block (D) predominantly comprising a conjugated diene compound, represented by the comonomer ratio based on a weight ratio, is 5/95–70/30, with 10/90–60/40 being particularly preferred.

The block copolymer (E) used in the present invention has a number average molecular weight of 5,000–600,000, preferably 10,000–500,000, and has a molecular weight distribution, i.e., a ratio (Mw/Mn) of a weight average molecular weight (Mw) to a number average molecular weight (Mn) of 10 or less.

The molecular structure of the block copolymer (E) may be linear, branched, radial, or an arbitrary combination thereof. Examples include an aromatic vinyl compound-conjugated diene compound block copolymer having a structure of C-D-C, D-C-D-C, (C-D-)$_4$Si, C-D-C-D-C, etc.

The partially hydrogenated block polymer (F) is obtained by partially hydrogenating unsaturated bonds derived from the conjugated diene compound in the block copolymer (E). In this case, hydrogenation is not completed, so as to allow further epoxidization of residual unsaturated bonds by use of a peroxide.

No particular limitation is imposed on the method for producing the block copolymer (E) used in the present invention, and any method may be employed so long as the above-described structures are obtained. For example, according to methods described in Japanese Patent Publication (kokoku) Nos. 23798/1965, 17979/1968, 32415/1971, and 28925/1981, an aromatic vinyl compound-conjugated diene compound block copolymer can be synthesized by use of a lithium catalyst and the like in an inert solvent. Furthermore, according to methods described in Japanese Patent Publication (kokoku) Nos. 8704/1967 and 6636/1968 and Japanese Patent Application Laid-Open (kokai) No. 133203/1984, the partially hydrogenated block copolymer (F) used in the present invention can be synthesized by hydrogenating the block copolymer (E) in the presence of a hydrogenation catalyst in an inert solvent.

However, unepoxidized block copolymer (E) or partially hydrogenated block polymer (F) has poor compatibility to the aromatic polycarbonate resin and aromatic polyester resin. Therefore, when the unepoxidized block copolymer is added to the aromatic resins, the block copolymer cannot attain a micro-dispersion state, to thereby inhibit improvement in impact strength.

The epoxy-modified block polymer (G) or (H), which is used in the present invention, is obtained through epoxidation of the above-described block copolymer (E) or (F). Briefly, the epoxy-modified block polymer (G) or (H) can be obtained by reacting with an epoxidizing agent such as a hydroperoxide or a peracid in an inert solvent.

Examples of the peracid include performic acid, peracetic acid, perbenzoic acid, and trifluoroperacetic acid. Of these, peracetic acid is one of preferred epoxidizing agents, because it is industrially produced on a large scale, can be inexpensively obtained, and has high stability.

Examples of the hydroperoxide include hydrogen peroxide, tert-butyl hydroperoxide, and cumene hydroperoxide.

In epoxidation, a catalyst may be employed according to needs. For example, when peracid is employed as an epoxidizing agent, an alkaline compound such as sodium carbonate or an acid such as sulfuric acid is used as the catalyst. Also, when a hydroperoxide is employed, catalytic effect can be obtained through use of hydrogen peroxide and a mixture of tungstic acid and caustic soda in combination; organic acid and hydrogen peroxide in combination; or molybdenum hexacarbonyl and tert-butyl hydroperoxide in combination.

No strict limitation is placed on the amount of an epoxidizing agent. The optimum amount thereof is determined depending on variable factors such as an epoxidizing agent to be used, desired degree of epoxidation, block copolymer to be epoxidized, etc.

The inert solvent may be used so as to reduce the viscosity of raw materials and to stabilize the epoxidizing agent through dilution. When the epoxidizing agent is peracetic acid, there may be used aromatic compounds, ethers, esters, etc. Examples of particularly preferable solvents include hexane, cyclohexane, toluene, benzene, ethyl acetate, carbon tetrachloride, and chloroform. Moreover, in the present invention, no strict limitation is imposed on the reaction conditions of epoxidation.

The range of the reaction temperature which can be employed is determined by reactivity of the epoxidizing agent. In the case of peracetic acid, the reaction temperature is preferably 0–70° C. When the temperature is lower than 0° C., the reaction rate is slow, whereas when it is in excess of 70° C., peracetic acid decomposes. Based on similar criteria, a system of tert-butyl hydroperoxide/molybdenum dioxide diacetylacetonate, which is an example of a hydroperoxide, has preferably a reaction temperature of 20° C.–150° C. No particular operation is required for allowing reaction of a mixture of a block copolymer and an epoxidizing agent. For example, the mixture is stirred for 2–10 hours to cause epoxidation. The obtained epoxy-modified copolymer can be isolated through an appropriate method such as precipitation in a poor solvent; injection of the polymer into hot water under stirring and removal of the solvent by evaporation; and direct removal of the solvent.

The amount of the epoxy-modified block polymer (G) or that of the epoxy-modified hydrogenated block polymer (H)

influences the mechanical properties of the resin composition. When the amount of the block polymer (G) or (H) is less than 2 parts by weight based on 100 parts by weight of the resin blend (I), impact strength is insufficient, whereas when it is in excess of 10 parts by weight, the flexural modulus and the deflection temperature under load are deteriorated.

To the resin composition according to the present invention, titanium oxide may be added.

Titanium oxide which is used in the present invention may be rutile or anatase. In general, in the case of resin compositions accompanying thermal treatment, rutile is preferable from the viewpoint of prevention of yellowing. The type of surface treatment and the particle size of titanium oxide are appropriately selected. A certain type of oil may be used in combination so as to enhance dispersibility of titanium oxide to the resin.

The amount of titanium oxide which is added to the resin composition is preferably 5–30 parts by weight based on 100 parts of the resin blend (I). Amounts less than 5 parts by weight result in poor covering of a thin-wall molded product having a thickness of 0.1–0.3 mm such as an IC card. However, when the amount is in excess of 30 parts by weight, impact resistance deteriorates and production cost increases, although satisfactory covering can be obtained.

In general, impact strength of typical resins deteriorate through incorporation of pigments such as titanium oxide or fillers, and it is known that aromatic polycarbonates particularly become more brittle as the amount of such pigments or fillers increases. However, the resin composition according to the present invention assumes the form of titanium oxide being contained more in or around the epoxy-modified block polymer (G) and/or the epoxy-modified hydrogenated block polymer (H). Thus, deterioration of the impact strength due to addition of titanium oxide is reduced.

In the present invention, customary reaction accelerators for epoxy groups can be used. In particular, there is preferred at least one compound selected from the group consisting of tertiary amines, quaternary ammonium salts, imidazoles, phosphonium salts, and organometallic complexes.

Examples of the tertiary amines include trialkylamines such as triethylamine, tributylamine, trihexylamine, or triamylamine; alkanolamines such as triethanolamine or dimethylaminoethanol; aliphatic or non-aromatic cyclic amines such as triethylenediamine; aromatic amines such as dimethylphenylamine, dimethylbenzylamine, 2-(dimethylaminomethyl)phenol, 2,4,6-tris (dimethylaminomethyl)phenol, or dimethylaniline; alicyclic amines such as pyridine, picoline, or 1,8-diazabicyclo(5.4.0) undecene-1; and salts of these tertiary amines with an organic or inorganic acid.

Examples of the quaternary ammonium salts include tetraalkylammonium halides such as tetra(C1–C6 alkyl) ammonium halides, e.g., tetramethylammonium chloride, tetraethylammonium chloride, or tetrabutylammonium bromide; trialkylaralkylammonium halides such as tri(C1–C6 alkyl)(C7–C10 aralkyl)ammonium halides, e.g., trimethylbenzylammonium chloride, triethylbenzylammonium chloride, or tripropylbenzylammonium chloride; and N-alkylpyridinium halides such as N-methylpyridinium chloride.

Examples of the imidazoles include 2-(C1–C18 alkyl) imidazoles such as 2-methylimidazole, 2-ethylimidazole, or 2-isopropylimidazole; 2-arylimidazoles such as 2-phenylimidazole; imidazole compounds having an alkyl group or an aryl group at 2- and/or 4-position such as 2-ethyl-4-methylimidazole or 4-phenyl-2-methylimidazole; imidazole compounds such as cyanoethylated imidazoles and triazine derivatives of cyanoethylated imidazoles; and salts of these imidazole compounds such as trimellitate salts and isocyanurate salts.

Examples of the phosphonium salts include tetraalkylphosphonium halides such as tetra(C1–C6 alkyl) phosphonium halides, e.g., tetramethylphosphonium bromide or tetrabutylphosphonium bromide; tetrabutylphosphonium benzotriazalate; tetraarylphosphonium halides such as tetraphenylphosphonium bromide; ethyltriphenylphosphonium bromide; and triphenylbenzylphosphonium bromide.

Examples of the organometallic complexes include tin compounds such as dibutyltin dilaurate and titanium compounds such as triisopropoxymethyl titanate.

Of these, tertiary amines such as dimethylphenylamine; quaternary ammonium salts such as triethylbenzylammonium chloride; phosphonium salts such as tetrabutylphosphonium bromide or tetraphenylphosphonium bromide; and tin compounds such as dibutyltin dilaurate are preferably used as the reaction accelerator for epoxy groups. These reaction accelerators for epoxy groups are added according to needs in an amount of 0.001–2 parts by weight based on 100 parts by weight of the resin blend (I), preferably 0.01–1 part by weight, more preferably 0.01–0.5 parts by weight. When the amount of the reaction accelerators for epoxy groups is in excess of 2 parts by weight, reaction of epoxy groups excessively to thereby form a disadvantageous gelation product.

To the resin composition according to the present invention, a variety of additives may be added, if necessary. Examples of the additives include pigments other than titanium oxide, dyes, reinforcements, inorganic fillers, heat resistance stabilizers, light resistance stabilizers, antioxidants, weather resistance agents, nucleating agents, lubricants, antistatic agents, flame-retardants, plasticizers, blowing agents, oil, near infrared light-absorbers, ultraviolet light-absorbers, cross-linking agents, hue-improving agents, and compounds having one or more active hydrogens which react with an epoxy group.

Examples of the inorganic fillers include calcium carbonate, silica, talc, clay, carbon black, barium sulfate, zinc oxide, magnesium hydroxide, mica, glass flakes, glass fiber, glass beads, glass balloons, stainless steel fiber, and alumina. The near infrared light-absorber is an additive which is useful for detecting a recording card when it is inserted into a card-reader and -writer in a read-out and write-in type recording apparatus.

With respect to the cross-linking agents, there may be used those typically employed in cross-linking of rubber, e.g., agents described in "Cross-linking Agent Handbook," Shinzo YAMASHITA and Tosuke KANEKO, published by Taisei-sha. Examples of preferable cross-linking agents include sulfur, sulfur compounds, p-benzoquinone dioxime, p,p'-dibenzoylquione dioxime, 4,4-dithio-bis (dimorpholine), poly-p-dinitrosobenzene, tetrachlorobenzoquinone, alkylphenol-formaldehyde resins, ammnoium benzoate, bismaleimide compounds, diepoxy compounds, dicalboxylic acid compounds, diol compounds, diamine compounds, aminoresins, organometallic salts, metal alkoxides, organometallic compounds, and organic peroxides. Examples of compounds having one or more active hydrogens which react with an epoxy group include compounds having an amino group, a carboxylic anhydride group, a phenolic hydroxyl group, a hydroxyl group, a carboxyl group, etc. Specific examples thereof include amine-modified silicone oil; styrene-maleic anhydride copolymer resins; urethane prepolymers of which molecular ends are terminated with phenolic hydroxyl groups; polyphenylene oxide resins; polyhydric alcohols such as glycerin or polyglycerin; polyoxytetramethylene glycol; polyoxypropylene glycol; polyethylene glycol; polyethylene glycol-polypropylene glycol copolymers; polyvinyl alcohol; ethylene-acrylic acid copolymers and metal salts thereof; ethylene-methacrylic acid copolymers and metal salts thereof; and styrene-methacrylic acid copolymers.

The resin composition according to the present invention may be produced through mixing by use of a variety of known mixers. For example, the components of the resin composition are dispersed and mixed by a tumble mixer or a Henschel mixer, or a high-speed mixer such as a ribbon blender or a super mixer, then melt-kneaded by use of an apparatus such as an extruder, a kneader, a heating roll, or a Banbury mixer.

EXAMPLES

The present invention will next be described in detail by way of examples; however, the invention is not limited only to these examples. Evaluation of properties of material resins and molded products described in Examples and Comparative Examples was carried out by use of the following methods.
(1) Epoxy equivalent: An extent of epoxidation of the epoxy-modified block polymer was evaluated by use of a titration method making use of hydrobromic acid.
(2) Izod impact strength (notched, 3.2 mm thickness): According to ASTM D256.
(3) Melt Index (250° C., 5 kgf): According to ASTM D1238.
(4) Flexural modulus: According to ASTM D790
(5) Falling ball impact strength: A steel ball having a weight of 500 g was allowed to fall on a sheet from the height of 30 cm, and the broken sheet was investigated in accordance with the method described in JIS X6301.
(6) Viscosity-average molecular weight: Intrinsic viscosity [η] of a methylene chloride solution was measured at 20° C. by use of an Ubbellode viscometer. Viscosity-average molecular weight was calculated by use of a well-known method.
(7) Terminal hydroxyl ratio: Terminal hydroxyl ratio was calculated from the ratio of the peak at 114.80 ppm to that at 129.50 ppm measured in a gated-coupling mode by $^{13}C$-NMR.

Resins used in Examples and Comparative Examples are as follows:

Aromatic polycarbonate resin A1: Trade name: Tafuron A2200 (product of Idemitsu Petrochemical K.K.); viscosity-average molecular weight: 22000; terminal hydroxyl ratio: 7%.

Aromatic polycarbonate resin A2: Trade name: Tafuron A2700 (product of Idemitsu Petrochemical K.K.); viscosity-average molecular weight: 27000; terminal hydroxyl ratio: 7%.

Aromatic polycarbonate resin A3: A polycarbonate resin produced as a trial product in Reference Example 1.

Aromatic polyester resin B1: Trade name: Duranex 2002 (product of Polyplastics K.K.); polybutylene terephthalate resin Aromatic polyester resin B2: Trade name: Easter PETG6763 (product of Eastman Chemical Co.); a copolymer which includes 1,4-cyclohexane-dimethylol and ethylene glycol as diol components.

Block copolymer E1: A block copolymer used in Reference Example 2 which has not yet been epoxidized.

Epoxy-modified block polymer G1: A product produced as a trial product in Reference Example 2.

Epoxy-modified hydrogenated block polymer H1: A product produced as a trial product in Reference Example 3.

Titanium oxide: Rutile titanium oxide CR63, product of Ishihara Sangyo K.K.

Reaction-accelerator for epoxy group J1: Diphenylamine

Reaction-accelerator for epoxy group J2: Triethylbenzylammonium chloride

Reference Example 1

Production of Aromatic Polycarbonate Resin (A3) by Use of a Transesterification Method in a Melt State 2,2-Bis(4-hydoxyphenyl)propane (22.8 kg, 100 mol), diphenyl carbonate (21.9 kg, 102.5 mol), an aqueous solution of lithium metaborate dihydrate (85 mg, 1×10$^{-3}$ mol), and boric acid (1.0 g, 2.4×10–2 mol) were placed in a flask, fused at 180° C. under nitrogen, and heated under adequate stirring to a final temperature of 270° C. under 0.1 torr, followed by evaporation of formed phenol to obtain a colorless and transparent aromatic polycarbonate resin (A3). The resin had a viscosity-average molecular weight of 23,000 and a terminal hydroxyl ratio of 28 mol %.

Reference Example 2

Production of Epoxy-modified Block Polymer (G1)

A block copolymer (300 g) which is a polystyrene-polybutadiene-polystyrene (product of Nihon Synthetic Rubber K.K., trade name: TR2000) and ethyl acetate (1500 g) were placed in a jacketed reactor equipped with a stirrer, a reflux condenser, and a thermometer, and dissolved. An epoxidation reaction was carried out under stirring at 40° C. for 3 hours while ethyl acetate solution (169 g) containing 30 wt. % peracetic acid was continuously added dropwise thereto. The reaction solution was cooled to room temperature and removed from the reactor, and a sufficient quantity of methanol was added thereto to precipitate a polymer. The polymer was separated by filtration, washed with water, and dried to yield an epoxy-modified block polymer G1. The epoxy-modified block polymer G1 had an epoxy equivalent of 470.

Reference Example 3

Production of Epoxy-modified Hydrogenated Block Polymer (H1)

A diene block copolymer which is a polystyrene-polybutadiene-polystyrene (product of Nihon Synthetic Rubber K.K., trade name: TR2000) (300 g) and cyclohexane (3000 g) were placed in a jacketed reactor equipped with a stirrer and a thermometer, and dissolved. A mixture (which had been produced by mixing di-p-tolylbis(1-cyclopentadienyl)titanium/cyclohexane solution (concentration: 1 mmol/liter) (40 ml) and n-butyllithium solution (concentration: 5 mmol/liter) (8 ml) at 0° C. and at 2.0 kg/cm$^2$ of hydrogen) was added at 60° C. as a hydrogenating catalyst, and the resultant mixture was subjected to reaction under a hydrogen partial pressure of 2.5 kg/cm$^2$ for 30 minutes. The resultant partially-hydrogenated copolymer solution was dried under reduced pressure for removing the solvent to obtain the partially-hydrogenated copolymer (the amount of the hydrogenated butadiene portion in the total butadiene portion in the copolymer: 30%). The partially-hydrogenated polymer (300 g) and cyclohexane (1500 g) were placed in a reactor (a jacketed flask having a capacity of 2 liters) and dissolved. An epoxidation reaction was carried out by stirring at 40° C. for 3 hours while ethyl acetate solution (300 g) containing 30 wt. % peracetic acid was continuously added dropwise thereto.

The reaction solution was cooled to room temperature and removed from the reactor, and sufficient methanol to precipitate a polymer was added thereto. The polymer was separated by filtration, washed with water, and dried to yield an epoxy-modified hydrogenated block polymer H1. The epoxy-modified hydrogenated block polymer H1 had an epoxy equivalent of 275.

Examples 1 to 22

An aromatic polycarbonate resin (A1, A2, or A3), an aromatic polyester resin (B1 or B2), an epoxy-modified block polymer (G1), and an epoxy-modified hydrogenated block polymer (H1) were blended in a composition as shown in Tables 1 and 2, and passed through a twin-rolled extruder to obtain the resin compositions of the present invention. The pellets of the resultant resin compositions were injection-molded into test pieces. The results of evaluation of their properties are shown in Tables 1 to 2.

Comparative Examples 1 to 5

Both of the resin ingredients containing block copolymer E1 that had not undergone epoxy-modification and the resin ingredients containing no block copolymer E1 were respectively passed through a twin-rolled extruder to obtain resin compositions (Table 3) as in Examples of the present invention. The pellets of the resultant resin compositions were injection-molded into test pieces. The results of evaluation of their properties are shown in Table 3.

Examples 23 and 24

The resin compositions obtained in Examples 10 and 17 were sheet-extrusion-molded to obtain IC-card-use sheets having a thickness of 0.1 and 0.2 mm. The results of evaluation of their properties of the sheets are shown in Table 4.

Comparative Example 6

The resin compositions obtained in Comparative Example 4 were similarly sheet-extrusion-molded to obtain sheets having a thickness of 0.1 and 0.2 mm. The results of evaluation of their properties of the sheets are shown in Table 4.

TABLE 1

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Resin composition | | | | | | | | | | | |
| Aromatic polycarbonate resin | | | | | | | | | | | |
| A1 | 70 | | | | | | | | | | |
| A2 | | 70 | 70 | 70 | | | | | | | |
| A3 | | | | | 70 | 70 | 60 | 60 | 50 | 60 | 70 |
| Aromatic polyester resin | | | | | | | | | | | |
| B1 | 30 | 30 | 30 | 30 | 30 | 30 | 40 | 40 | 50 | 40 | 30 |
| B2 | | | | | | | | | | | |
| Block copolymer | | | | | | | | | | | |
| E1 | | | | | | | | | | | |
| G1 | 10 | 10 | 10 | 10 | 10 | 5 | 10 | 5 | 10 | 10 | 5 |
| H1 | | | | | | | | | | | |
| Titanium oxide | | | | | | | | | | 20 | 20 |
| Reaction-accelerator for epoxy groups | | | | | | | | | | | |
| J1 | | | 0.05 | | | | | | | | |
| J2 | | | | | 0.1 | | | | | | |
| Properties | | | | | | | | | | | |
| Izod impact strength (J/m) | 78 | 79 | 83 | 78 | 81 | 75 | 70 | 78 | 69 | 73 | 78 |
| Melt index (g/10 min) | 22 | 15 | 16 | 17 | 22 | 28 | 24 | 32 | 35 | 34 | 31 |
| Flexural modulus (MPa) | 1920 | 1870 | 1860 | 1840 | 1970 | 2210 | 1950 | 2220 | 1900 | 2050 | 2200 |

TABLE 2

| | Examples | | | | | | | | | | |
|---|---|---|---|---|---|---|---|---|---|---|---|
| | 12 | 13 | 14 | 15 | 16 | 17 | 18 | 19 | 20 | 21 | 22 |
| Resin composition | | | | | | | | | | | |
| Aromatic polycarbonate resin | | | | | | | | | | | |
| A1 | | | | 70 | | | | | | | |
| A2 | | | | | | | | | | | |
| A3 | 60 | 60 | 60 | | 70 | 70 | 60 | 60 | 50 | 60 | 70 |
| Aromatic polyester resin | | | | | | | | | | | |
| B1 | 40 | | | 30 | 30 | 30 | | 40 | 50 | 40 | 30 |
| B2 | | 40 | 40 | | | | 40 | | | | |

TABLE 2-continued

|  | Examples | | | | | | | | | | |
|---|---|---|---|---|---|---|---|---|---|---|---|
|  | 12 | 13 | 14 | 15 | 16 | 17 | 18 | 19 | 20 | 21 | 22 |
| Block copolymer | | | | | | | | | | | |
| E1 | | | | | | | | | | | |
| G1 | 5 | 5 | 10 | | | | | | | | |
| H1 | | | | 10 | 10 | 10 | 10 | 10 | 10 | 5 | 5 |
| Titanium oxide | 20 | | | | | 20 | 20 | | | | |
| Reaction-accelerator for epoxy groups | | | | | | | | | | | |
| J1 | | | 0.5 | | | | | | | | |
| J2 | | | | | | | | | 0.8 | | |
| Properties | | | | | | | | | | | |
| Izod impact strength (J/m) | 65 | 82 | 87 | 82 | 83 | 78 | 80 | 76 | 83 | 73 | 73 |
| Melt index (g/10 min) | 36 | 15 | 14 | 22 | 23 | 25 | 17 | 36 | 39 | 38 | 25 |
| Flexural modulus (MPa) | 2200 | 1590 | 1550 | 1920 | 1940 | 1900 | 1570 | 2000 | 1920 | 2100 | 1960 |

TABLE 3

|  | Comparative Examples | | | | |
|---|---|---|---|---|---|
|  | 1 | 2 | 3 | 4 | 5 |
| Resin composition | | | | | |
| Aromatic polycarbonate resin | | | | | |
| A1 | 70 | | | | |
| A2 | | 70 | | | |
| A3 | | | 50 | 60 | 60 |
| Aromatic polyester resin | | | | | |
| B1 | 30 | 30 | 50 | | 40 |
| B2 | | | | 40 | |
| Block copolymer | | | | | |
| E1 | | | | 5 | |
| G1 | | | | | 10 |
| H1 | | | | | |
| Titanium oxide | | | | | |
| Reaction-accelerator for epoxy groups | | | | | |
| J1 | | | | | |
| J2 | | | | | |
| Properties | | | | | |
| Izod impact strength (J/m) | 7 | 7 | 7 | 6 | 8 |
| Melt index (g/10 min) | 33 | 15 | 50 | 21 | 19 |
| Flexural modulus (MPa) | 2270 | 2280 | 1830 | 1800 | 1680 |

TABLE 4

|  | Examples | | Comp. Examples |
|---|---|---|---|
|  | 23 | 24 | 6 |
| Resin composition | | | |
| Aromatic polycarbonate resin | | | |
| A1 | | | |
| A2 | | | |
| A3 | 60 | 70 | 60 |
| Aromatic polyester resin | | | |
| B1 | 40 | 30 | |
| B2 | | | 40 |
| Block copolymer | | | |
| E1 | | | |
| G1 | 10 | | |
| H1 | | 10 | |
| Titanium oxide | 20 | 20 | |
| Reaction-accelerator for epoxy groups | | | |
| J1 | | | |
| J2 | | | |
| Properties | | | |
| Sheet thickness (mm) | 0.1 / 0.2 | 0.1 / 0.2 | 0.1 / 0.2 |
| Falling ball impact strength (500 g, 30 cm) | Not broken / Not broken | Not broken / Not broken | Broken / Broken |

An improvement in impact resistance of resins through the aid of polymer blend requires increase of compatibility between an elastomer component and resins. Conventionally, the polymer blend often produces little improvement because of decrease in impact resistance thereby due to poor compatibility. However, as is apparent from Tables 1 to 4, the resin composition of the present invention reliably produces improvement. The composition of the present invention combines fluidity and impact resistance while keeping fluidity.

That is, the resin composition of the present invention has excellent mold-processability and impact resistance. The resin composition is a thermoplastic resin composition which can be used as material for components of thin-wall molded products, office-automation appliances, communications equipment, household electrical appliances, and automobile structural elements.

As described above, the resin composition of the present invention simultaneously has excellent fluidity and excellent impact resistance because of good dispersion properties of an impact-resistance-modifying component thereof. Since the resin composition of the present invention has excellent mold-processability and impact resistance, the composition can be used for a variety of uses including thin-wall molded products such as integrated circuits (IC) cards, playing cards, and floppy disks; office-automation appliances; communications equipment such as portable phones; housings, chassis, and other elements of household electrical appliances; and automobile parts.

What is claimed is:

1. A resin composition comprising 100 parts by weight of a resin blend (I) formed of:

an aromatic polycarbonate resin (A) in an amount of 40–80 wt. %, an aromatic polyester resin (B) in an amount of 60–20 wt. %, such that the sum of (A)+(B) is 100 wt. %; and 2–10 parts by weight of an epoxy-modified block polymer (G) and/or an epoxy-modified hydrogenated block polymer (H), wherein the epoxy-modified block polymer (G) is a polymer which is obtained by epoxidation of double bonds derived from the conjugated diene compound in a block copolymer (E) which comprises in the molecule a polymer block (C) predominantly comprising an aromatic vinyl compound and a polymer block (D) predominantly comprising a conjugated diene compound; and wherein the epoxy-modified hydrogenated block polymer (H) is a polymer which is obtained by epoxidation of residual double bonds in a partially hydrogenated block polymer (F) which is formed by partial hydrogenation of double bonds derived from the conjugated diene compound in the block copolymer (E); and wherein said resin composition further comprises 0.001–2 parts by weight, based on 100 parts by weight of the resin blend (I), of a reaction accelerator for epoxy groups.

2. A resin composition according to claim 1, wherein the aromatic polycarbonate resin (A) has a ratio of the number of terminal hydroxy groups to the total number of molecular ends in the polycarbonate resin of 1–40%.

3. A resin composition according to claim 1, wherein the aromatic polyester resin (B) is at least one species selected from among polybutylene terephthalate (PBT), polyethylene terephthalate (PET), poly(1,4-cyclohexanedimethylene) terephthalate, and poly(1,4-cyclohexanedimethylene/ethylene)terephthalate.

4. A resin composition according to claim 1, which further contains titanium oxide in an amount of 5–30 parts by weight based on 100 parts by weight of the resin blend (I).

5. An integrated circuit (IC) card or playing card formed by molding a resin composition as described in claim 1.

6. A molded product formed by molding a resin composition as described in claim 1.

* * * * *